No. 650,660. Patented May 29, 1900.
E. T. SCHOONMAKER.
PHOTOGRAPHIC PLATE CLIP.
(Application filed Aug. 18, 1899.)
(No Model.)
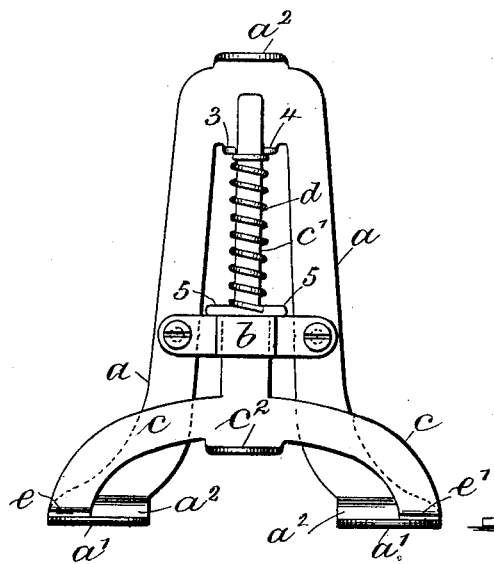
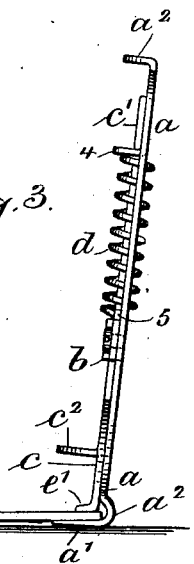
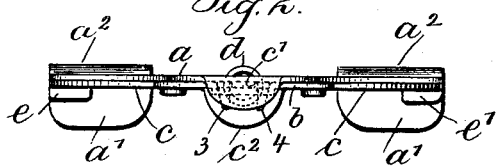
Witnesses
Chas. H. Smith
J. Staib
Inventor
Edward T. Schoonmaker
per L. W. Serrell & Son
Attys

UNITED STATES PATENT OFFICE.

EDWARD T. SCHOONMAKER, OF NEW YORK, N. Y.

PHOTOGRAPHIC-PLATE CLIP.

SPECIFICATION forming part of Letters Patent No. 650,660, dated May 29, 1900.

Application filed August 18, 1899. Serial No. 727,626. (No model.)

*To all whom it may concern:*

Be it known that I, EDWARD T. SCHOONMAKER, a citizen of the United States, residing in the city of New York, (Fordham,) county and State of New York, have invented an Improvement in Holders for Photographic Plates, of which the following is a specification.

Devices of various kinds have heretofore been employed for holding photographic plates during development, so as to prevent the fingers of the operator becoming stained by contact with the developing chemicals. Most of these devices fail to hold the plate with any degree of safety, while others tend to obscure the view of the developing image.

My invention is adapted to engage the photographic plate at one edge and to grip the same at two adjacent places, and in carrying out my invention I use a frame and a spring-actuated spanner moving in a plane parallel to the frame and in guides made thereon. The ends of the frame and the adjacent opposing ends of the spanner form jaws to engage the edge of the plate.

In the drawings, Figure 1 is an elevation; Fig. 2, a plan view, and Fig. 3 an edge view showing the holder in position upon a plate.

The frame $a$ is of inverted-V shape, and it is provided with projecting tapering ends $a'$, with a finger-lug $a^2$, with guides 3 4, and a guide-bar $b$. The spanner $c$ is provided with a stem $c'$ and with a finger-lug $c^2$, with projections 5, and with tapering ends $e\ e'$, which are adjacent and opposite to the tapering ends $a'$ of the frame.

The stem $c'$ slides through the guide-bar $b$, and between the guides 3 4 and around said stem, between the guides 3 4 and the projections 5, is a helical spring $d$, whose office is to force the tapering ends $e\ e'$ toward the tapering ends $a'$ of the frame, and said tapering ends are separated against the action of the spring, so as to receive between them the edge of the photographic plate by the action of the fingers against the finger-lugs $a^2\ c^2$. I do not limit myself to the peculiar outline of the holder, as the same might be varied without departing from the structural features or operation of the device.

The tapering ends $a'$ of the frame and $e\ e'$ of the spanner occupy an obtuse angle to the plane of the frame and spanner, so that when the holder is on the photographic plate it is not at right angles thereto, but at an obtuse angle thereto, which more nearly agrees with the angle of the sides of the developing-tray and which at the same time does not interfere with a full and complete view of the photographic plate when the same is raised by the holder to view the developing image.

The base of the frame $a$ adjacent to the tapering ends $a'$ is preferably made with a receding curved portion $a^2$ to permit the advancing edge of the photographic plate to pass back of the tapering ends $e\ e'$ to increase the leverage of the holder and bring the point of contact of the ends $e\ e'$ away from the edge of the plate to lessen the liability of breakage or chipping the edge of the glass.

I claim as my invention—

1. A holder for photographic plates comprising a frame having projecting tapering portions at one end, an intermediate guide and a finger-lug at the other end, a spring and a spanner actuated thereby and in the same plane as the frame and having projecting tapering ends adjacent to the tapering ends of the frame and a finger-lug adjacent to the tapering ends so that the finger-lugs come at opposite ends of the holder and opposite sides of the spring, substantially as specified.

2. A holder for photographic plates, comprising a frame, two projecting tapering ends, guides and a guide-bar and a finger-lug formed upon said frame, a spanner and a stem therefor in the same plane as the frame and moving through the guide-bar and guides of the frame, the spanner having a finger-lug and tapering ends adjacent to the tapering ends of the frame and a helical spring around the stem of the spanner for actuating the same, substantially as set forth.

3. A holder for photographic plates, comprising an inverted-V-shaped frame with two projecting tapering ends at an obtuse angle to the frame, a finger-lug at the end opposite to the tapering ends, two guides and a guide-bar, a spanner having tapering ends adjacent and in opposition to the tapering ends of the frame, a stem and a finger-lug and projections integral with the spanner, the stem moving through the guide-bar and guides of the frame, and a helical spring around the stem between the projections thereof and the guides of the frame for actuating the spanner, substantially in the manner and for the purposes set forth.

4. A holder for photographic plates, comprising an inverted-V-shaped frame with two projecting tapering ends at an obtuse angle to the frame and a receding curved portion adjacent thereto, a finger-lug at the end opposite to the tapering ends, two guides and a guide-bar, a spanner having tapering ends adjacent and in opposition to the tapering ends of the frame, a stem and a finger-lug and projections integral with the spanner, the stem moving through the guide-bar and guides of the frame, and a helical spring around the stem between the projections thereof and the guides of the frame for actuating the spanner, substantially in the manner and for the purposes set forth.

Signed by me this 16th day of August, 1899.

EDWARD T. SCHOONMAKER.

Witnesses:
    GEO. T. PINCKNEY,
    S. T. HAVILAND.